United States Patent [19]

Desperben et al.

[11] Patent Number: 4,594,725

[45] Date of Patent: Jun. 10, 1986

[54] COMBINED ADAPTIVE EQUALIZATION AND DEMODULATION CIRCUIT

[75] Inventors: Lydie Desperben, Joinville; Hikmet Sari, Creteil; Saïd Moridi, Paris; Georges Bonnerot, Les Ulis, all of France

[73] Assignee: U.S. Philips Corporation, New York, N.Y.

[21] Appl. No.: 608,060

[22] Filed: Jun. 28, 1984

[30] Foreign Application Priority Data

May 11, 1983 [FR] France .................................. 83 07910

[51] Int. Cl.$^4$ .............................................. H04B 3/14
[52] U.S. Cl. ........................................ 375/15; 375/14; 333/18; 364/724
[58] Field of Search ......................... 375/11, 12, 14, 15; 364/724, 825; 333/18, 28 R

[56] References Cited

U.S. PATENT DOCUMENTS 3,890,572 6/1975 Desblanche et al. .................. 375/15
4,475,211 10/1984 Mattis, Jr. et al. .................... 375/15

Primary Examiner—Robert L. Griffin
Assistant Examiner—Raymond C. Glenny
Attorney, Agent, or Firm—William J. Streeter; Marianne R. Rich

[57] ABSTRACT

An adaptive equalizer arrangement for digital transmission system comprises at the output of the transmission channel a first in-phase path and in parallel with this first path, a second quadrature path, both paths being of the non-recursive transversal filter type having n branches and $(n-1)$ delay circuits between the inputs of these branches, each of these n branches comprising, arranged in series, a mixer, a low-pass filter, a multiplier, and having their outputs connected to an adder which is followed by a sampling circuit and thereafter by a comparator circuit to decide the symbols to be transmitted from the outputs of these paths. The arrangement also comprises a third control path which comprises two subtracting circuits to determine the differences between the signals before and after decision and a control circuit of a voltage-controlled oscillator, 2n phase shifters and 2n multipliers.

6 Claims, 4 Drawing Figures

COMBINED ADAPTIVE EQUALIZATION AND DEMODULATION CIRCUIT

BACKGROUND OF THE INVENTION

The present invention relates to an adaptive equalizer arrangement for digital transmission systems, and more specifically to high-speed systems in which the transmission channel is not known in advance and/or is susceptible to variations with time. It is therefore suitable for use in digital radio links, data transmission over the switched telephone network, digital transmission over cables (special networks of the Traspac type, etc.).

The use of adaptive equalizers in high-speed digital transmission systems to compensate for the amplitude and phase distortions of the channel has been common practice during several years already. After their introduction in systems for data transmission over the switched telephone network the adaptive equalizers will be used in digital radio links in the near future. The equalizers used in practice have generally one of the following structures: (a) a non-recursive transversal filter, (b) a transversal filter having a recursive portion whose input is constituted by the previously decided symbols. Adapting the equalizer to the channel and to its possible variations with time is generally effected with the aid of a method known as the stochastic gradient of the mean-square error. The two equalizer structures mentioned above and their adaption have been described in several articles, inter alia in: C. Macchi et al., "Récepteurs adaptatifs pour transmission de données á grande vitesse", Annales des Télécommunications, Vol. 30, No. 9–10, September–October 1975.

The equalizers often operate in the baseband and consequently act on demodulated signals. On the other hand, the systems of a high spectral efficiency employ modulation of two quadrature carriers. In these systems, to compensate for the intersymbol interference in the in-phase and quadrature-phase paths and to compensate for the interference between these two paths, the equalizer must have four branches, each of which is constituted by a transversal filter; the recursive portion, if any, likewise comprises four transversal filters.

Another disadvantage of baseband equalizers will become apparent in considering the synchronization of the carrier necessary for the demodulation. Actually, the recovery of the carrier in systems employing modulation of two quadrature carriers utilizes the baseband signals and the decisions (see the article by A. Leclert and P. Vandamme, published in IEEE Transactions on Communications, Vol. COM-31, No. 1, January 1983, pages 130 to 136). There are therefore two possibilities: (a) either the signals at the output of the demodulator and the decisions at this point are used, in such a case the system is not very robust as it is very sensitive to channel distortions, (b) or the two output signals of the equalizer and their decisions are used, in such a case the system is not sensitive to channel distortions. However, in the latter case, the carrier recovery loop comprises an additional delay which is the propagation time of the signals through the equalizer and which, when the equalizer is very long (as is the case in data transmission over cables), tends to render the carrier recovery loop unstable. The loop will then not be capable of tracking large frequency deviations (as is described in, for example, the article by R. W. Chang and R. Srinivasagopalan, "Carrier recovery for data communication systems with adaptive equalization" published in IEEE Transactions on Communications, Vol. COM-28, No. 8, August 1980, pages 1142 to 1153). The same problem occurs in digital equalizers, even if they do not comprise many coefficients, as the propagation time cannot be disregarded.

With regard to this delay problem in baseband equalizers, intermediate-frequency equalizers, denoted IF-equalizers, have been introduced (D. D. Falconer, "Jointly Adaptive Equalization and Carrier Recovery in Two-Dimensional Digital Communication Systems", BSTJ, Vol. 55, No. 3, March 1976, pages 317–334). In the systems using IF-equalization, the carrier recovery is very robust because of the double advantage that equalized signals are used and the delay of the equalizer plays no part in the carrier recovery. The IF-equalizer of the Falconer type, as do also the baseband equalizers, utilizes the mean-square error criteron for the adaption. Its disadvantage is that it requires sampling of the IF-signal at the symbol rate and, for its adaption, the remodulation of decisions of the equalizer. The need for sampling of these two IF-signals may cause problems for a practical implementation, as the IF-carrier frequency is high. The sampling of the IF-signal is then very sensitive to jitter at the sampling instant. In any case, it is more difficult to sample an IF-signal than to sample an associated baseband signal.

SUMMARY OF THE INVENTION

The invention has for its object to provide an adaptive equalizer arrangement which acts on a non-sampled intermediate-frequency signal but which at the same time functions as a demodulator and whose output is consequently a baseband signal.

The invention therefore relates to an adaptive equalizer arrangement for digital transmission systems, characterized in that it comprises:

(1) a first in-phase path provided at the output of the transmission channel of the system and whose structure is that of a non-recursive transversal filter having n branches and (n−1) delay circuits between the n inputs of these branches, each of these n branches comprising, arranged in series:
 (a) a mixer;
 (b) a lowpass filter;
 (c) a multiplier;
the outputs of these n branches being connected to an adder which is followed by a sampling circuit and thereafter by a comparator circuit for deciding the symbols $â_k$ to be transmitted from the output of this in-phase path and of the arrangement;

(2) arranged in parallel with this first path, a second quadrature path which also has the structure of a non-recursive transversal filter having n branches and (n−1) delay circuits between the n inputs of these branches, each of these n branches likewise comprising, arranged in series:
 (d) a mixer;
 (e) a lowpass filter;
 (f) a multiplier;
the outputs of these n branches being connected to an adder which is followed by a sampling circuit and thereafter by a comparator circuit for deciding the symbols $b̂_k$ to be transmitted from the output of this quadrature path and of the arrangement;

the multipliers of these first and second paths being placed in each branch either at the head, before the corresponding mixers, or at the output of the lowpass filters;

(3) a third control path comprising:
(g) two subtracting circuits for determining the differences $e'_k$ and $e''_k$ between the signals before decision, $X_k$ and $Y_k$, and after decision, $\hat{a}_k$ and $\hat{b}_k$, in the comparator circuits;
(h) a voltage-controlled oscillator producing a signal of the type $\sin(\omega_o t + \phi)$ where $\omega_o$ corresponds to the frequency of the carrier;
(i) at the output of this oscillator, n first parallel-arranged phase shifters whose outputs apply to the respective n second inputs of the mixers in the in-phase path a demodulation signal of the type $\sin(\omega_o t + \phi + \theta_m)$ where $\theta_m$ is the phase shift for the $(m+1)^{st}$ branch and m varies from 0 to $(n-1)$;
(j) also at the output of the voltage-controlled oscillator, a $\pi/2$ phase shifter followed by n second parallel-arranged phase shifters whose outputs apply to the n second inputs of the mixers in the quadrature path a demodulation signal of the type $\cos(\omega_o t + \phi + \theta_m)$;
(k) a control circuit for the voltage-controlled oscillator, the 2n phase shifters and the 2n multipliers.

The invention also relates, in a variation thereof, to a similar arrangement but in which the third control path comprises:
(g) two subtracting circuits for determining the differences $e'_k$ and $e''_k$ between the signals before and after decision in the comparator circuits;
(h) n voltage-controlled oscillators whose outputs apply directly to the respective n second inputs of the mixers in the in-phase path a demodulation signal of the type $\sin(\omega_o t + \phi + \theta_m)$ where $\omega_o$ corresponds to the carrier frequency, $\theta_m$ is the phase shift for the $(m+1)^{st}$ branch and m varies from 0 to $(n-1)$, and apply by means of a $\pi/2$ phase shifter a demodulation signal of the type $\cos(\omega_o t + \phi + \theta_m)$ to the respective n second inputs of the mixers in the quadrature path.
(i) a control circuit for the n voltage-controlled oscillators and the 2n multipliers.

The above-proposed arrangement has in either of the two embodiments the following advantages: a simple structure with two paths instead of four as in the baseband equalizer or the intermediate-frequency equalizer of the Falconer type, a control of the carrier recovery loop by equalized signals, a compensation of the major portion of the delay of the equalizer having for its consequence, for the carrier recovery loop, the possibility to track larger frequency deviations without reaching the instability threshold, no sampling of intermediate-frequency and no remodulation of the decisions. Put more concisely, this arrangement has therefore the advantage that it is less sensitive to sampling errors compared with the intermediate-frequency equalizer, gives better performances (less delay in the loop) compared with the baseband equalizer, and has a much simpler implementation than the intermediate-frequency equalizer or the baseband equalizer.

BRIEF DESCRIPTION OF THE DRAWINGS

Particulars and advantages of the invention will now be described in greater detail by way of example in the following description with respect to the accompanying drawings, in which:

FIG. 2 illustrates the substitution of digitally controlled multipliers for analog multipliers in the embodiment of FIG. 1a;

DESCRIPTION OF THE PREFERRED EMBODIMENTS

Before the arrangement according to the invention will be described it should be borne in mind that, when utilizing amplitude-modulation of two quadrature carriers as the transmission procedure, the signal received has the shape:

$$R(t) = A(t) \cdot \sin \omega_o t + B(t) \cdot \cos \omega_o t \quad (1)$$

where $A(t)$ and $B(t)$ are low-frequency signals with regard to the frequency of the two carriers $\sin \omega_o t$ and $\cos \omega_o t$. These signals are connected with the transmitted symbols by relations of the type:

$$A(t) = \sum_k [a_k h'(t - kT) - b_k h''(t - kT)] \quad (2)$$

$$B(t) = \sum_k [b_k h'(t - kT) + a_k h''(t - kT)] \quad (3)$$

where $h'(t)$ and $h''(t)$ are real and imaginary parts, respectively, of the complex impulse response of the transmission channel, and where the terms $a_k$ and the terms $b_k$ are symbol trains modulating at the rate $1/T$ the two carriers $\sin \omega_o t$ and $\cos \omega_o t$, respectively (T=symbol period).

Figure 1A:
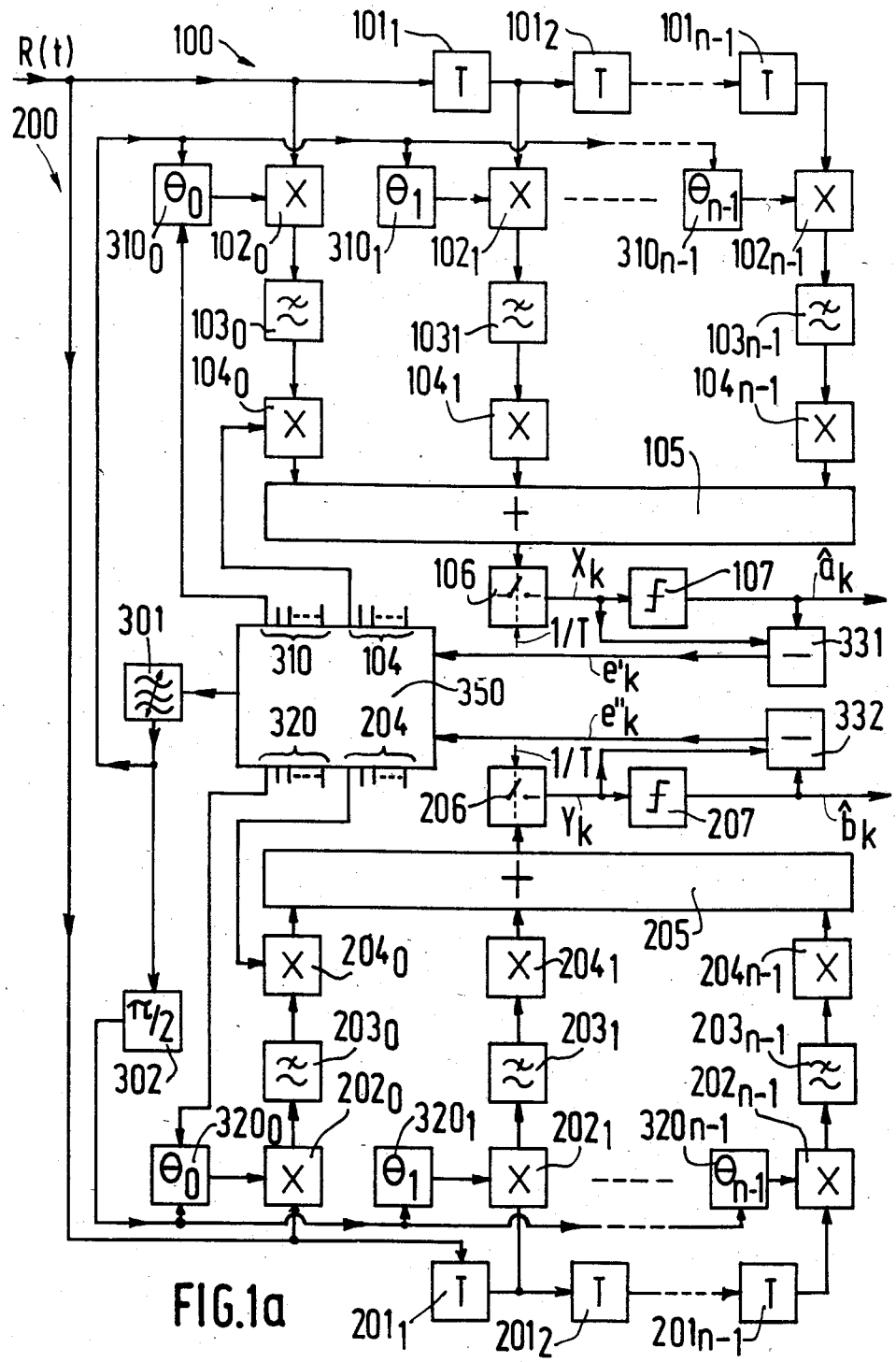
FIG. 1a shows a first embodiment of the arrangement according to the invention, and FIG. 1b the control circuit included in this embodiment.

In the embodiment shown in FIG. 1a, the equalizing arrangement according to the invention has a non-recursive transversal filter structure in which, put more precisely, the output signal $R(t)$ of the transmission channel constituting the input signal for the equalizer arrangement is applied to an in-phase path 100 and also to a quadrature path 200, which each comprise a non-recursive transveral filter having n branches and $(n-1)$ delay circuits $101_1$ to $101_{n-1}$ and $201_1$ to $201_{n-1}$ between the inputs of these branches. The delay produced by these circuits is here equal to T, the inter-symbol interval, but may have a lower value, for example T/2, without limiting the invention.

In the transversal filter of the in-phase path 100, the input signal of the $(m+1)^{st}$ branch is:

$$R(t - mT) = A(t - mT) \cdot \sin \omega_o(t - mT) + B(t - mT) \cdot \cos \omega_o(t - mT) \quad (4)$$

This signal is applied to a mixer 102, which at a further input receives a demodulation signal $\sin(\omega_o t + \phi + \theta_m)$ supplied by a control path which will be described hereinafter, and thereafter to a lowpass filter 103 whose output signal is given by $$P_m(t) = A(t - mT) \cdot \cos(\phi + \theta_m + \omega_o mT) + B(t - mT) \cdot \sin(\phi + \theta_m + \omega_o mT) \quad (5)$$

In its turn, this signal is applied to a multiplier 104 which produces a signal:

$$X_m(t) = r_m \cdot P_m(t) \quad (6)$$

which is conveyed to one of the n inputs of an adder 105, at the output of which the output signal of the transversal filter of the in-phase path 100 is available (as this path comprises n branches, n mixers $102_0$ to $102_{n-1}$, n lowpass filters $103_0$ to $103_{n-1}$ and n multipliers $104_0$ to $104_{n-1}$ are provided). This output signal of the adder 105 and of the filter:

$$X(t) = \sum_{m=0}^{m=n-1} X_m(t) \qquad (7)$$

is then sampled at the rate 1/T in a sampling circuit 106, and the samples thus formed are compared with thresholds in a comparator circuit 107 to decide the symbols $\hat{a}_k$ transmitted through the in-phase path 100.

Similarly, in the transversal filter of the quadrature path 200, the signal at the input of the $(m+1)^{st}$ branch passes through a mixer 202 and, after demodulation by the signal $\cos(\omega_o t + \phi + \theta_m)$ which is also supplied by the said control path, through a lowpass filter 203 and a multiplier 204, the output of the circuits 203 and 204 then being:

$$Q_m(t) = -A(t-mT)\cdot\sin(\phi+\theta_m\omega_o mT) + B(t-mT)\cdot\cos(\phi+\theta_m+\omega_o mT) \qquad (8)$$

and $$Y_m(t) = r_m \cdot Q_m(t) \qquad (9)$$

An adder 205 combines the outputs of the n branches by supplying a signal:

$$Y(t) = \sum_{m=0}^{m=n-1} Y_m(t) \qquad (10)$$

which is sampled at the same rate 1/T in a circuit 206, the samples supplied by this circuit being compared with thresholds in a circuit 207 to decide the symbols $\hat{b}_k$ transmitted through the quadrature path 200 (which quadrature path also comprises n branches, the remark made in the foregoing as regards the number of circuits also holds here).

The demodulation signal is applied to each of these in-phase and quadrature paths 100 and 200 by a control path 300, which comprises a voltage-controlled oscillator 301, 2n phase shifters $310_0$ to $310_{n-1}$ and $320_0$ to $320_{n-1}$, and a control loop for this oscillator, these 2n phase shifters and 2n multipliers $104_0$ to $104_{n-1}$ and $204_0$ to $204_{n-1}$. The n phase shifters $310_0$ to $310_{n-1}$ of the in-phase path 100 are fed in parallel directly by the oscillator 301 and their outputs are connected to the second input of the corresponding mixer 102, while the n phase shifters $320_0$ to $320_{n-1}$ of the quadrature path 200, which are also fed in parallel by the oscillator 301 but after having passed through a $\pi/2$ phase shifter 302, have their outputs connected to the second input of the corresponding mixers $202_0$ to $202_{n-1}$; these phase shifters are here either capacitive circuits or, which is simpler, delay circuits capable of being controlled.

The control of the oscillator 301 is obtained by utilizing as a criterion the search for the minimum mean-square error J, given by:

$$J = E(e'_k{}^2 + e''_k{}^2) \qquad (11)$$

where the symbol E denotes the mathematical expectation, the terms $e'_k$ and $e''_k$ being given by:

$$e'_k = X_k - \hat{a}_k \qquad (12)$$

$$e''_k = Y_k - \hat{b}_k \qquad (13)$$

in which $t_o$ being the sampling instant, the notations:

$$X_k = X(t)_{t=kT+t_o}$$

$$Y_k{}'' Y(t)_{t=kT+t_o}$$

are used.

The gradient of J with respect to $r_m$ is written:

$$\frac{\partial J}{\partial r_m} = 2E\left(e'_k \frac{\partial e'_k}{\partial r_m} + e''_k \frac{\partial e''_k}{\partial r_m}\right) \qquad (14)$$

or:

$$\frac{\partial J}{\partial r_m} = 2E(e'_k p_m{}^k + e''_k q_m{}^k) \qquad (15)$$

where:

$$p_m{}^k = [p_m(t)]_{t=kT-t_o} \text{ and } q_m{}^k = [Q_m(t)]_{t=kT+t_o}$$

Similarly, by writing the gradient of J with respect to $\theta_m$, it is found that:

$$\frac{\partial J}{\partial \theta_m} = 2E(e'_k Y_m{}^k - e''_k X_m{}^k) \qquad (16)$$

wherein $$Y_m{}^k = Y_m(t)_{t=kT+t_o}$$

$$X_m{}^k = Y_m(t)_{t=kT+t_o}$$

By using the well-known stochastic gradient algorithm (see the above-mentioned article by C. Macchi et al.), the adaption of the multipliers $104_0$ to $104_{n-1}$ and $204_0$ to $204_{n-1}$, which produce respective multiplications or attenuations $r_0, r_1, r_2, \ldots, r_{n-1}$ in the n branches of the in-phase path 100 and the quadrature path 200, and the adaptation of the phase shifters $310_0$ to $310_{n-1}$ and $320_0$ to $320_{n-1}$, which likewise produce respective phase shifts $\theta_0, \theta_1, \theta_2 \ldots \theta_{n-1}$ in the n branches of the paths 100 and 200, are realized in accordance with the following two relations (in which m always varies from 0 to n−1), which gives the expressions of the signals received by these multipliers and phase shifters, respectively (these signals being identical for the branches of the same ordinal number of paths 100 and 200):

$$r_m{}^{k+1} = r_m{}^k - \alpha(p_m{}^k e'_k + q_m{}^k e''_k) \qquad (17)$$

$$\theta_m{}^{k+1} = \theta_m{}^k - \beta(Y_m{}^k e'_k - X_m{}^k e''_k) \qquad (18)$$

where $\alpha$ and $\beta$ are positive constants representing the algorithm step and which are sufficiently small to guarantee the stability of the algorithm.

On the other hand, the gradient of J with respect to the phase $\phi$ of the oscillator 301 is written:

$$\frac{\partial J}{\partial \phi} = 2E(e'_k Y_k - e''_k X_k) \qquad (19)$$

and this oscillator is consequently controlled by the signal:

$$\epsilon_k = e'_k Y_k - e''_k X_k \quad (20)$$

or by a filtered version of this signal.

In the example of the arrangement described with reference to FIG. 1a, the control circuit 350 of the oscillator 301, the phase shifters $310_0$ to $310_{n-1}$ and $320_0$ to $320_{n-1}$ and the multipliers $104_0$ to $104_{n-1}$ and $204_0$ to $204_{n-1}$ comprise (see FIG. 1b):

(a) for controlling the oscillator 301 in accordance with the expression (20), two multipliers 351 and 352, a subtractor 353 for subtracting the terms $e'_k Y_k$ and $e''_k X_k$ thus obtained, and a lowpass loop filter 354 whose output signal is conveyed to the oscillator 301;

(b) for controlling each of the phase shifters in accordance with the expression (18), likewise two multipliers 361 and 362, a subtractor 363, a multiplier 364 which receives the coefficient $\beta$ at its second input, and a subtractor 365 which is associated with a delay circuit 366 producing a time delay T, the output of this subtractor being applied to the corresponding phase shifter in the paths 100 and 200;

(c) for controlling each of the multipliers in accordance with expression (17), likewise two multipliers 381 and 382, an adder 383, a multiplier 384 which receives the coefficient $\alpha$ at its second input, and a subtractor 385 which is associated with a delay circuit 386 producing a time delay T, the output of this subtractor being applied to the corresponding multiplier in the paths 100 and 200.

It will be clear that the present invention is not limited to the embodiment described above, from which variations can be proposed without departing from the scope of the invention.

For the adaption of the phase shifters and the multipliers, it is, for example, sufficient to use the signs of $e'_k$, $e''_k$, $X_m^k$ and $Y_m^k$ and to replace the expressions (17) and (18), respectively by the expressions (21) and (22) which are much simpler to implement:

$$r_m^{k+1} = r_m^k - \alpha(sgn X_m^k \cdot sgn\, e'_k + sgn Y_m^k \cdot sgn\, e''_k) \quad (21)$$

and $$\theta_m^{k+1} = \theta_m^k - \beta(sgn Y_m^k \cdot sgn\, e'_k - sgn X_m^k \cdot sgn\, e''_k) \quad (22)$$

(since the signs of $e'_k$, $e''_k$, $X_m^k$, $Y_m^k$ instead of their values are used, the use of either $sgn X_m^k$ or $sgn\, p_m^k$ gives equivalent results and the same applies for $sgn Y_m^k$ and $sgn\, q_m^k$, as these terms have the same signs). Likewise, a simplified control of the oscillator 301 can be obtained by replacing the expression (20) by:

$$\epsilon = sgn\, Y_k \cdot sgn\, e'_k - sgn\, X_k \cdot sgn\, e''_k \quad (23)$$

Figure 1B:
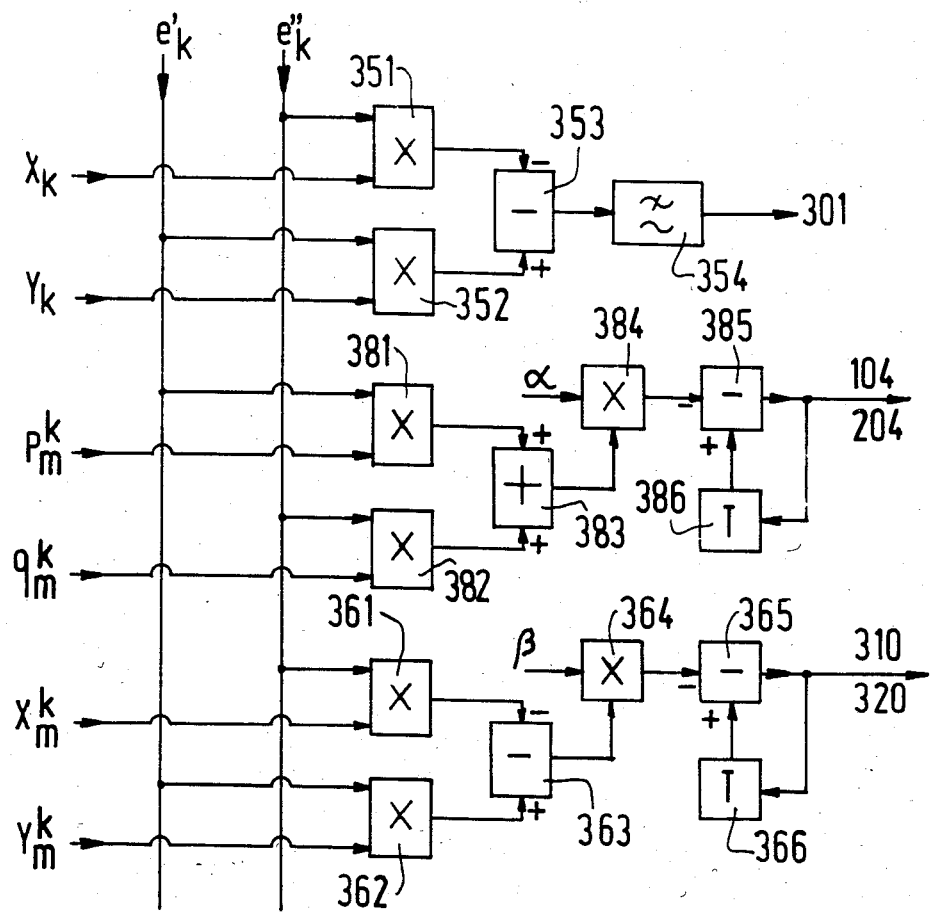

This variation is, put concretely, obtained on the basis of FIG. 1b by arranging zero-comparators (not shown here) just before the inputs of the two multipliers 351 and 352, of the 2n multipliers 361, 362 and of the 2n multipliers 381, 382.

Figure 2:
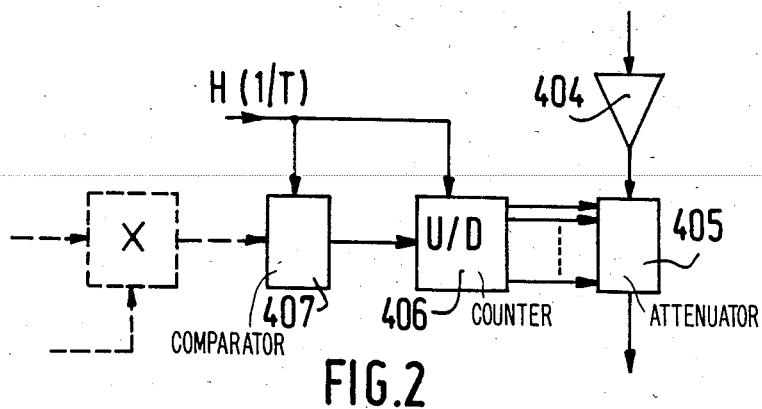

Moreover, the control circuit 350 as it is described above is of the analog type, but a digital variation can be proposed, which modifies, in FIG. 1b, the circuit portions situated at the outputs of multipliers 364, 384. In this case the 2n multipliers $104_0$ to $104_{n-1}$ and $204_0$ to $204_{n-1}$ are replaced (see FIG. 2) by a same number of series arrangements comprising an amplifier 404 and a digitally controlled attenuator 405 whose parallel inputs are connected to the outputs (which are equal in number) of an up/down counter 406 which is controlled by a zero-comparator 407, this comparator being provided at the outputs of the multipliers 364 and 384.

Figure 3:
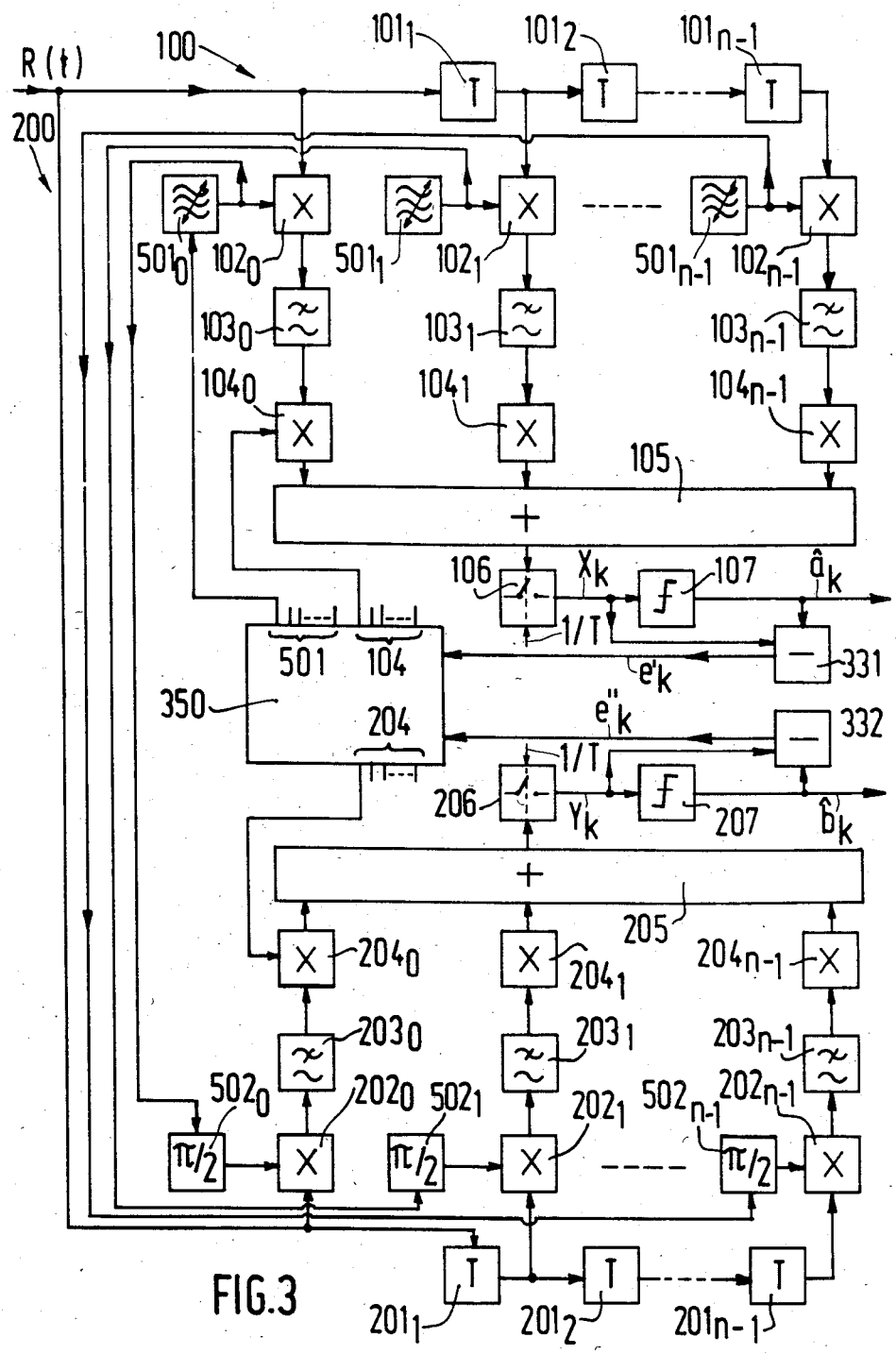
FIG. 3 shows a second embodiment of the arrangement according to the invention.

It should also be noted that in a second embodiment shown in FIG. 3, the phase shifting function ensured by the 2n phase shifters $310_0$ to $310_{n-1}$ and $320_0$ to $320_{n-1}$ may be transferred to n voltage-controlled oscillators $501_0$ to $501_{n-1}$, which directly control the mixers $102_0$ to $102_{n-1}$ of the in-phase path 100 and, through the $\pi/2$ phase shifters $502_0$ to $502_{n-1}$, also control the mixers $202_0$ to $202_{n-1}$ of the quadrature path 200; the control signals produced by the control circuit 350 remain identical, with the exception of the control signal for the oscillator 301 which does not exist any more, as this oscillator is no longer present.

It should also be noted that the position of the multiplier 104 shown in FIG. 1a is not the only possible position, it being possible to place these multipliers at the head of n branches of the filter instead of having them precede the adders 105 and 205.

Finally, it should be noted that to explain the operating principle, the description has been limited to an equalizer in the form of a transversal filter without recursive portion, but it is equally possible to include such a recursive portion without modification or restriction of the invention. When there is a recursive portion, its input signals may be the previous decisions (in the case of non-linear equalizer) or delayed versions of the output signal of the equalizer (in the case of a linear equalizer).

What is claimed is:

1. An adaptive equalizer arrangement for a digital transmission system, characterized in that it comprises:

(1) a first in-phase path provided at the output of the transmission channel of the system and whose structure is that of a transversal filter having n branches and (n−1) delay circuits between the n inputs of these branches, each of these n branches comprising, arranged in series:
 (a) a mixer;
 (b) a lowpass filter;
 (c) a multiplier;

the outputs of these n branches being connected to means for deciding the symbols $\hat{a}_k$ to be transmitted from the output of this in-phase path and of the arrangement;

(2) arranged in parallel with this first path, a second quadrature path which also has the structure of a transversal filter having n branches and (n−1) delay circuits between the n inputs of these branches, each of these n branches comprising, arranged in series:
 (d) a mixer;
 (e) a lowpass filter;
 (f) a multiplier;

the outputs of these n branches being connected to means for deciding the symbols $\hat{b}_k$ to be transmitted from the output of this quadrature path and of the arrangement; the multipliers of these first and second paths being placed in each branch either at the head, before the corresponding mixers, or at the output of the lowpass filters;

(3) a third control path comprising:
 (g) two subtracting circuits for determining the differences $e'_k$ and $e''_k$ between the signals before decision, $X_k$ and $Y_k$, and after decision, $\hat{a}_k$ and $\hat{b}_k$, expressed for the in-phase path and for the quadrature path by the respective expressions:

$e'_k = X_k - \hat{a}_k$ (where $X_k = X(t)_{t=kt+t_o}$)

and $e''_k = Y_i - \hat{b}_k$ (where $Y_k = Y(t)_{t=kT+t_o}$)

where X(t) and Y(t) are the output signals of the transversal filter of the in-phase path and the quadrature path, respectively, and $t_o$ is the sampling instant;

(h) a voltage-controlled oscillator producing a signal of the type sin $(\omega_o t + \phi)$ where $\omega_o$ corresponds to the frequency of the carrier, which oscillator is controlled by the signal $\epsilon_k = e'_k Y_k - e''_k X_k$ (i) at the output of this oscillator, n first parallel-ranged phase shifters whose outputs apply to the respective n second inputs of the mixers in the in-phase path a demodulation signal of the type sin $(\omega_o t + \phi \theta_m)$ where $\theta_m$ is the phase shift for the $(m+1)^{st}$ branch and m varies from o to $(n-1)$;

(j) also at the output of the voltage-controlled oscillator, a $\pi/2$ phase shifter followed by n second parallel-arranged phase shifters whose outputs apply to the n second inputs of the mixers in the quadrature path a demodulation signal of the type cos $(\omega_o t + \phi + \theta_m)$;

(k) a control circuit for the voltage-controlled oscillator, the 2n phase shifters and the 2n multipliers.

2. An adaptive equalizer arrangement for a digital transmission system, characterized in that it comprises:

(1) a first in-phase path provided at the output of the transmission channel of the system and whose structure is that of a non-recursive transversal filter having n branches and $(n-1)$ delay circuits between the n inputs of these branches, each of these n branches comprising, arranged in series:
 (a) a mixer;
 (b) a lowpass filter;
 (c) a multiplier;
the outputs of these n branches being connected to means for deciding the symbols $\hat{a}_k$ to be transmitted from the output of this in-phase path and of the arrangement;

(2) arranged in parallel with this first path, a second quadrature path which also has the structure of a transversal filter having n branches and $(n-1)$ delay circuits between n inputs of these branches, each of these n branches likewise comprising, arranged in series:
 (d) a mixer;
 (e) a lowpass filter;
 (f) a multiplier;
the outputs of these n branches being connected to means to determine the symbols $\hat{b}_k$ to be transmitted from the output of this quadrature path and of the arrangement; the multipliers of these first and second paths being placed in each branch either at the head, before the corresponding multiplying circuits, or at the outputs of the lowpass filters;

(3) a third control path comprising:
 (g) two subtracting circuits for determining the differences $e'_k$ and $e''_k$ between the signals before decision, $X_k$ and $Y_k$, and after decision, $\hat{a}_k$ and $\hat{b}_k$, expressed for the in-phase path and for the quadrature path by the respective expressions;

$e'_k = X_k \hat{a}_k$ (where $X_k = X(t)_{t=kT+t_o}$)

and $e''_k = Y_k - \hat{b}_k$ (where $Y_k = Y(t)_{t=kT+t_o}$)

where X(t) and Y(t) are the output signals of the transversal filter of the in-phase path and the quadrature path, respectively, and $t_o$ is the sampling instant;

(h) n voltage-controlled oscillators whose outputs apply directly to the respective in second inputs of the mixers in the in-phase path a demodulation signal of the type sin $(\alpha_o t + \phi + \theta_m)$ where $\omega_o$ corresponds to the frequency of the carrier, $\theta_m$ is the phase shift for the $(m+1)^{st}$ branch and n varies from o to $(n-1)$, and apply by means of a $\pi/2$ phase shifter a demodulation signal of the type cos $(\omega_o t + \phi + \theta_m)$ to the respective n second inputs of the mixers of the quadrature path;

(i) a control circuit for the n voltage-controlled oscillators and the 2n multipliers.

3. An arrangement as claimed in claim 1, characterized in that the control circuit comprises:

(a) two multipliers, a subtractor and a loop filter to supply the control signal $\epsilon_k$ for the voltage-controlled oscillator, defined by:

$\epsilon_k = e'_k Y_k - e''_k X_k;$ (b) two multipliers, a subtractor, a multiplier, a subtractor and a delay circuit to supply the control signal $\theta_m^{k+1}$ for the 2n phase shifters in the n branches defined by:

$\theta_m^{k+1} = \theta_m^k - \beta(Y_m^k e'_k - X_m^e e''_k)$ where $\beta$ is a positive constant with $\beta < 1$;

(c) two multipliers, an adder, a multiplier, a subtractor and a delay circuit to supply the control signal $r_m^{k+1}$ for the 2n multipliers in the n branches defined by:

$r_m^{k+1} = r_m^i - \alpha(p_m^k e'_k + q_m^k e''_k)$, where $\alpha$ is a positive constant with $\alpha < 1$.

4. An arrangement as claimed in claim 2, characterized in that the control circuit comprises:

(a) two multipliers, a subtractor, a multiplier, a subtractor and a delay circuit to supply the control signal $\theta_m^{k+1}$ for the n oscillators defined by:

$\theta_m^{k+1} = \theta_m^k - \beta(Y_m^k e'_k - X_m^k e''_k)$, where $\beta$ is a positive constant with $\beta < 1$;

(b) two multipliers, an adder, a multiplier, a subtractor and a delay circuit to supply the control signal $r_m^{k+1}$ for the 2n multipliers of the n branches defined by:

$r_m^{k+1} = r_m^k - \alpha(p_m^k e'_k + q_m^k e''_k)$, where $\alpha$ is a positive constant with $= < 1$.

5. An arrangement as claimed in claim 1 characterized in that the multipliers of the control circuit are preceded by a same number of zero-comparators.

6. An arrangement as claimed in claim 1, wherein said decision means comprises sampling circuit means, and comparator means connected to said sampling circuit means.

* * * * *

UNITED STATES PATENT AND TRADEMARK OFFICE
CERTIFICATE OF CORRECTION

PATENT NO. : 4,594,725

DATED : June 10, 1986

INVENTOR(S) : Lydie Desperben et al

It is certified that error appears in the above-identified patent and that said Letters Patent is hereby corrected as shown below:

Claim 1 Col 8 Line 51 after "branches" insert --likewise--

Claim 2 Col 10 Line 1, change "$X_{k\hat{a}k}$" to --$X_k - \hat{a}_k$--

Claim 2 Col 10 Line 11, change "in" to --$\underline{n}$--

Claim 2 Col 10 Line 35 change "$Xm^e e"k)$" to --$X_m^k e"K)$--

Signed and Sealed this

Thirteenth Day of December, 1988

Attest:

DONALD J. QUIGG

*Attesting Officer*    *Commissioner of Patents and Trademarks*